July 22, 1958 A. E. SWANSON 2,844,216
AIR FILTERING APPARATUS
Filed April 2, 1956 3 Sheets-Sheet 1
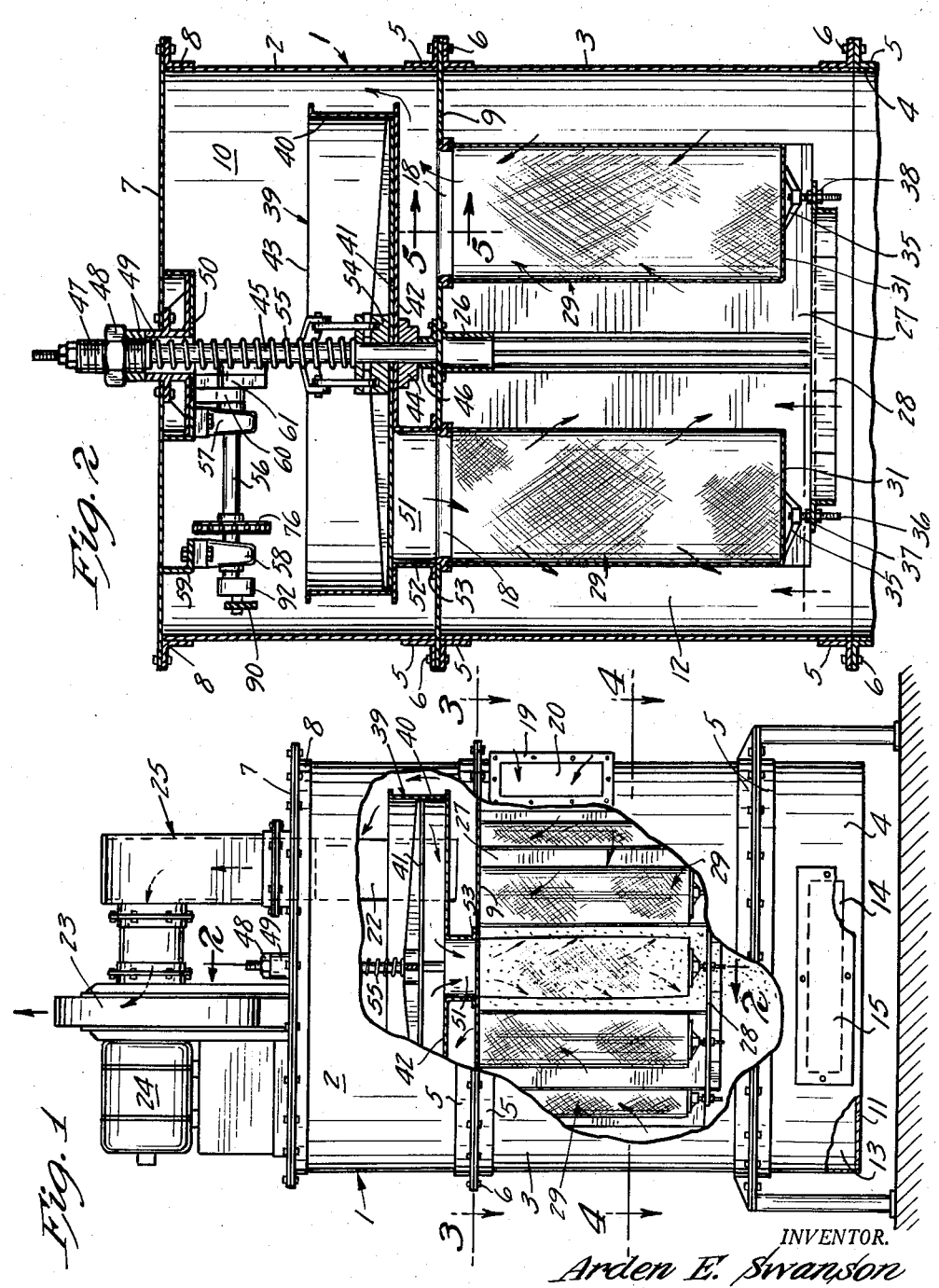
INVENTOR.
Arden E. Swanson
BY
Merchant & Merchant
ATTORNEYS July 22, 1958  A. E. SWANSON  2,844,216
AIR FILTERING APPARATUS
Filed April 2, 1956  3 Sheets-Sheet 2
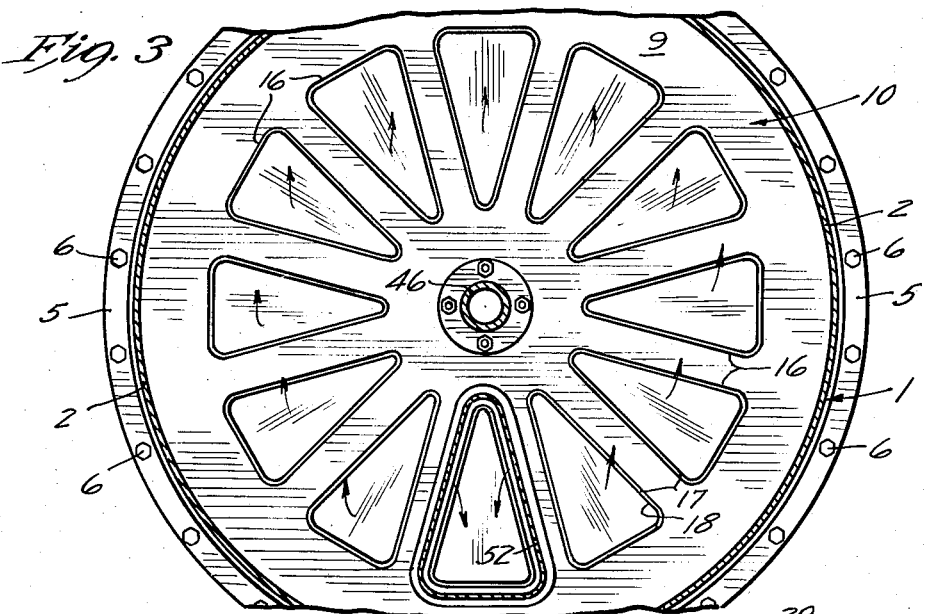
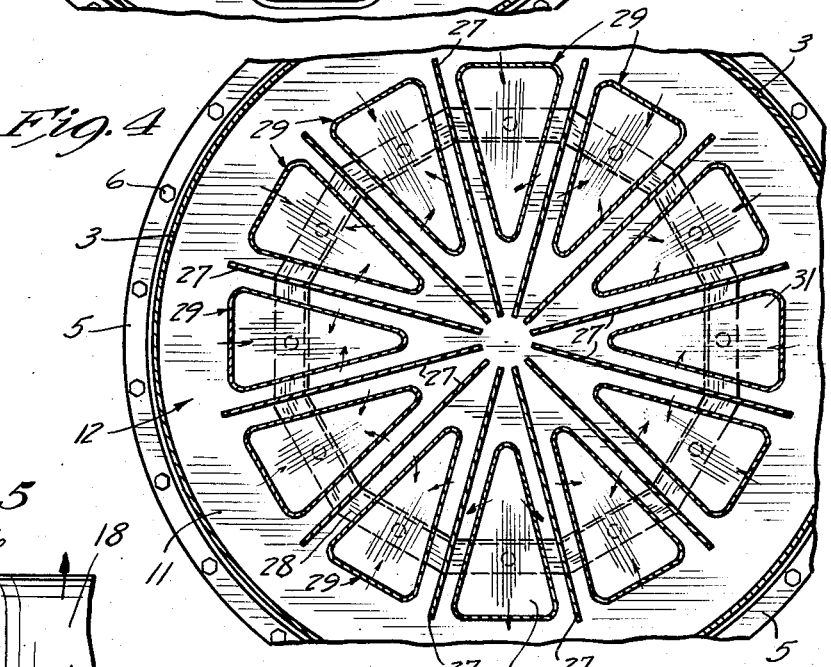
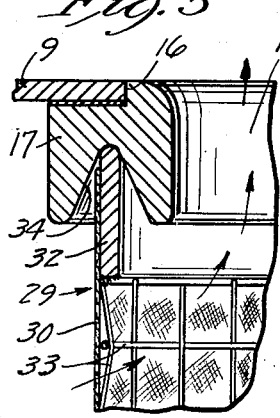
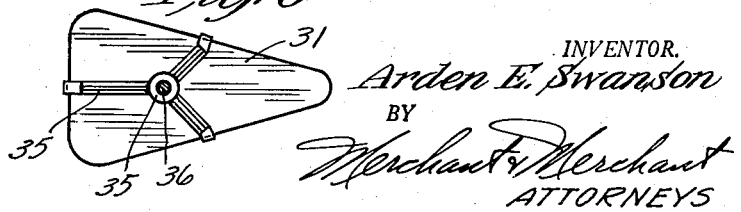
INVENTOR.
Arden E. Swanson
BY
Merchant & Merchant
ATTORNEYS July 22, 1958 — A. E. SWANSON — 2,844,216
AIR FILTERING APPARATUS
Filed April 2, 1956 — 3 Sheets-Sheet 3
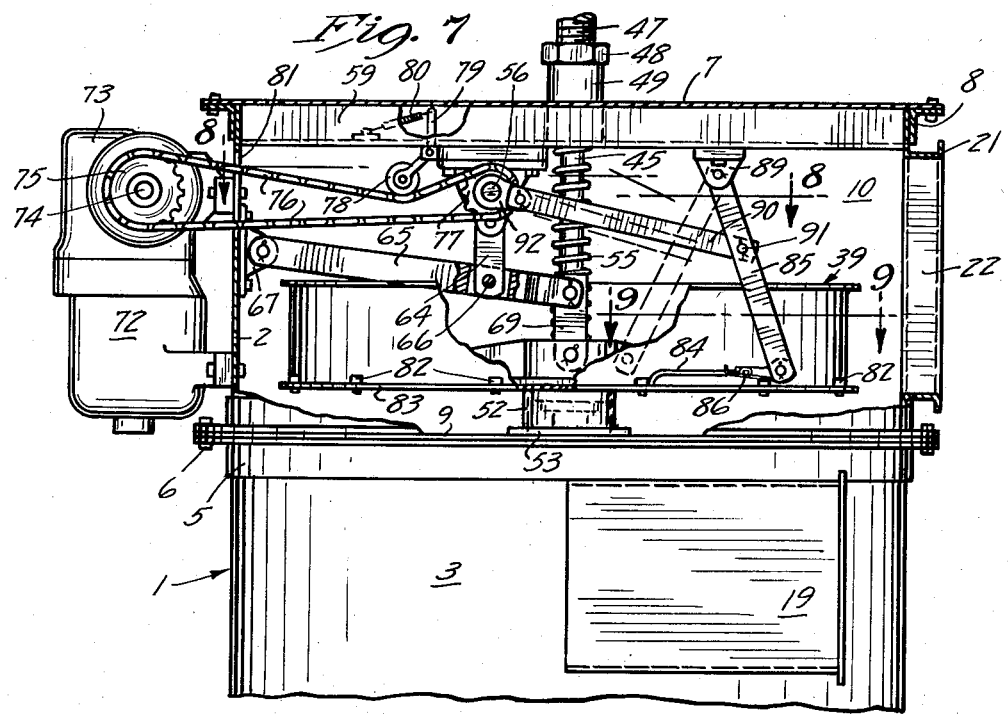
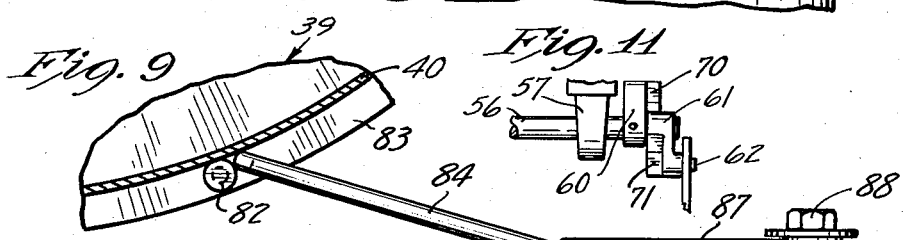
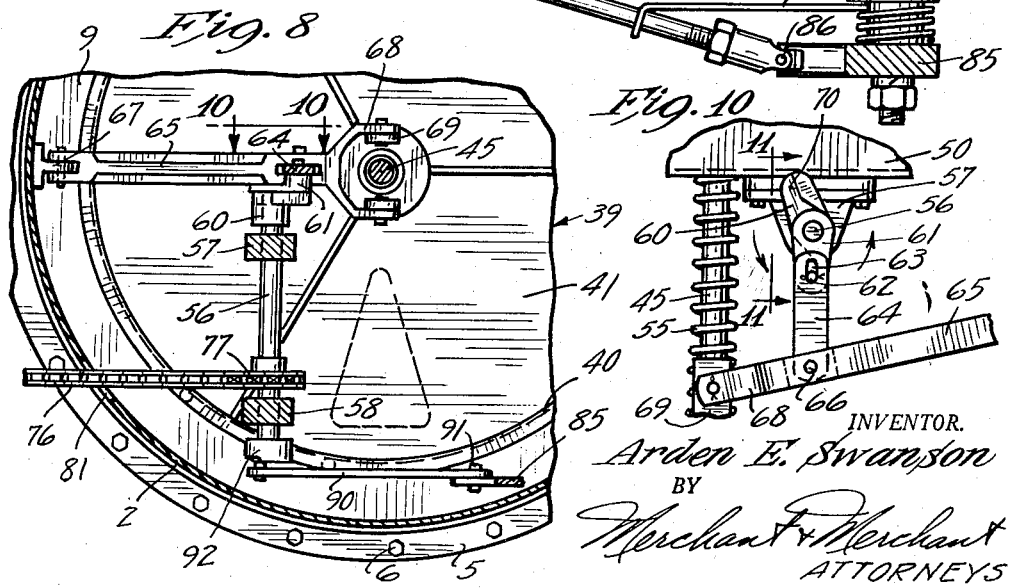
INVENTOR.
Arden E. Swanson
BY
Merchant & Merchant
ATTORNEYS

United States Patent Office 2,844,216
Patented July 22, 1958

2,844,216
AIR FILTERING APPARATUS

Arden E. Swanson, Minneapolis, Minn., assignor to The Day Company, Minneapolis, Minn., a corporation of Minnesota Application April 2, 1956, Serial No. 575,667

2 Claims. (Cl. 183—57)

My invention relates generally to dust control equipment and, more specifically, to improvements in dust filtering apparatus utilized in removing dust from air in mills, elevators, or plants wherein dust presents a problem.

More particularly, my invention relates to filtering apparatus including air filtering elements having porous sub-filter walls upon which dust particles accumulate, and to novel means for removing such accumulated dust.

An important object of my invention is the provision of air filtering apparatus defining a chamber having an inlet for dust laden air, at least two outlets, and filter means associated with each of said outlets, and of novel means for cleaning one of the filter means through the medium of a reverse air flow therethrough during normal operation of the other of said filter means and without materially disturbing the normal air flow to said chamber through the inlet passage, or without affecting the normal air cleaning function of the filter means associated with the other of said outlets.

Another important object of my invention is the provision of air filtering apparatus of the above type having a plurality of filter elements, and of novel means for producing said reverse flow of air through said filter elements in succession.

Another object of my invention is the provision of air filtering apparatus as set forth having casing structure defining a separating chamber and a filtered air chamber, and having a partition common to said chambers and inlet and discharge passages leading to said separating chamber and from said filtered air chamber respectively, said partition defining a plurality of outlet passages between said chambers, a plurality of filter elements in said separating chamber and each associated with a different one of said outlet passages, and an air compressor in said filtered air chamber having means for connecting one side to each of the outlet passages in succession, and having its opposite side in communication with the interior of the filtered air chamber and the others of said outlets, whereby, when the compressor apparatus is operated to produce a given volume of reverse air flow through a given filter element, an equivalent volume of filtered air will be drawn into the filtered air chamber through the other filter elements.

Another object of my invention is the provision of novel air compressor apparatus and of novel means for shifting the same to connect one side thereof to each of said outlet passages after the filter elements associated therewith in succession.

A still further object of my invention is the provision of air compressor apparatus comprising a cylinder and a cooperating piston mounted in said filter air chamber, and of novel means for imparting movement to said piston at a relatively slow rate in one direction to charge said cylinder, and in the opposite direction at relatively high speed to provide a quick surge of reverse air flow through the filter element to be cleaned.

Still another object of my invention is the provision of an air filtering apparatus as set forth which occupies a minimum of floor space relative to the volume of air handled thereby.

A still further object of my invention is the provision of filtering apparatus as set forth which is relatively inexpensive to produce and install, which is highly efficient in operation, and which is rugged in construction and durable in use.

The above and still further highly important objects and advantages of my invention will become apparent from the following detailed specification, appended claims and attached drawings.

Referring to the drawings, which illustrate the invention, and in which like reference characters indicate like parts throughout the several views:

Fig. 1 is a view in side elevation of an air filtering apparatus made in accordance with my invention;

Fig. 2 is an enlarged fragmentary axial section taken substantially on the line 2—2 of Fig. 1, some parts being removed;

Fig. 3 is an enlarged transverse section taken substantially on the line 3—3 of Fig. 1, some parts being broken away;

Fig. 4 is an enlarged transverse section taken on the line 4—4 of Fig. 1, some parts being broken away;

Fig. 5 is an enlarged fragmentary detail in section, taken substantially on the line 5—5 of Fig. 2;

Fig. 6 is a fragmentary view partly in bottom plan and partly in section taken substantially on the line 6—6 of Fig. 2;

Fig. 7 is an enlarged fragmentary view in side elevation as seen from the left to the right with respect to Fig. 2, some parts being broken away and some parts shown in section;

Fig. 8 is a fragmentary section taken substantially on the line 8—8 of Fig. 7;

Fig. 9 is an enlarged fragmentary detail as seen from the line 9—9 of Fig. 7;

Fig. 10 is a fragmentary detail as seen substantially from the line 10—10 of Fig. 8; and Fig. 11 is a fragmentary detail taken substantially on the line 11—11 of Fig. 10.

In the preferred embodiment of the invention illustrated, a casing structure, indicated in its entirety by the numeral 1, is shown as comprising superposed upper, intermediate and lower casing wall sections 2, 3 and 4 respectively secured together by suitable mounting flanges 5 and nut-equipped screws or the like 6. A cover element 7 overlies the upper end of the upper casing section 2 and is bolted or otherwise rigidly secured to a mounting flange 8 at the upper end of the section 2. Interposed between the lower end of the upper section 2 and the upper end of the intermediate section 3 is a partition 9 which cooperates with the upper section 2 and cover plate 7 to define a filtered air chamber 10. The bottom casing section 5 is provided with a closed bottom wall 11 which cooperates with the lower wall section 4, intermediate section 3 and partition 9 to define a separating chamber 12, the lower end 13 of which provides a receptacle for settled-out dust as will hereinafter become apparent. With reference to Fig. 1 it will be seen that the lower wall section 4 is provided with an opening 14 for the removal of accumulated dust, this opening being normally closed by a removale closure plate or the like 15.

The partition 9, which forms a wall common to both chambers 10 and 12 defines a plurality of circumferentially spaced segmental apertures 16, each provided with a rubber-like gasket 17 defining an outlet passage 18 leading from the separating chamber 12 to the filtered air chmaber 10. The intermediate casing wall 3 is provided with flanged tubular coupling element 19 which defines an air inlet passage 20 that is adapted to be connected to a source of dust laden air to be cleaned, such as any given room or space. If desired, the entire apparatus may be located within the room to be cleaned, or remote therefrom, in which case suitable duct work not shown will be connected to the coupling element 19 to conduct dust laden air to the separating chamber 12. The upper wall section 2 is provided with a tubular coupling element 21 defining an air discharge passage 22 for the disposal of filtered air from the upper chamber 10. Means for drawing dust laden air from the source to be cleaned to the separating chamber 12 and from the filtered air chamber 10 is shown as comprising a conventional exhaust fan or blower driven by a motor 24 and connected to the outlet passage defining coupling element 21 by a suitable conduit indicated generally at 25. The blower 23, motor 24 and conduit 25 do not comprise the instant invention and, for the purpose of brevity, further detailed showing and description thereof is believed unnecessary. It should be obvious that the blower 23 may be disposed after the discharge passage 22 as shown, or between the inlet passage 20 and the source of dust laden air if desired.

With reference to Fig. 3, it will be noted that the segmental outlet passages 18 are arranged in circumferentially spaced relation about a common center, said center being the axis of the generally cylindrical casing structure 1. A mounting sleeve 26 is welded or otherwise rigidly secured to the under surface of the partition 9 and extends axially downwardly therefrom to provide anchoring means for a plurality of circumferentially spaced vertically disposed radial baffle plates 27 which are welded or otherwise rigidly secured at their upper end portions to said sleeve 26 and the under surface of the partition 9, one each between an adjacent pair of the outlet passages 18, see Fig. 4. At their lower ends, the baffle plates 27 are rigidly secured to and support a generally annular mounting ring 28 at the lower end portion of the filter chamber 12. The mounting ring 28 serves as a base for mounting a plurality of cross sectionally segmental tubular filter elements each comprising a tubular porous filter wall 30, an imperforate or nonporous bottom wall 31, a mounting ring 32, and an inner open reinforcing wall 33 made from relatively close wire mesh and extending from the non-porous bottom wall 31 to the mounting ring 32. The open reinforcing wall 33 is preferably of the same cross sectional segmental shape as the filter wall 30 and reinforces the same against currents of air flowing to the interior thereof. The mounting ring 32 of filter element 29 is shown in Fig. 5 as being adapted to be received in a downwardly opening annular channel 34 of a respective gasket element 17 and has sealing engagement therewith. With reference to Figs. 1, 2 and 6 it will be seen that each filter element 29 is supported in engagement with its respective gasket 17 by a spider 35 having a threaded stem 36 which is screw threaded through a nut or the like 37 preferably welded or otherwise rigidly secured to the mounting ring 28. A lock nut 38 prevents accidental movement of the spider 35.

Dust laden air, drawn from the source of supply to the chamber 12 moves through the filter walls 30 to the interiors of said filter, depositing dust and other foreign material on the outer wall surfaces of the filter walls 30. The filtered air moves upwardly within the several filter elements 29 and through their respective outlet passages 18 to the upper filtered air chamber 10, and from thence outwardly through the discharge opening or passage 22. During the filtering operation, the heavier dust particles gravitate to the lower chamber portion 13 and settle on the bottom wall 11 thereof. However, a substantial amount of the lighter weight dust clings to the outer surfaces of the filter walls 30 and ultimately cover the pores of the filter wall 30 to such an extent that air flow therethrough becomes highly restricted and retarded. It is therefore necessary that the filter elements 30, which are preferably made from fine mesh cloth fabric, be periodically treated to remove the particles adhering thereto. For this purpose I provide a novel mechanism and arrangement for producing a reverse air flow through each of the filter elements in a manner to permit continued operation of the machine during the cleaning of the filter elements thereof, and now to be described.

An air compressor 39 comprises a cylinder 40 and a piston 41 mounted therein for reciprocatory movements between the closed lower end 42 and the open upper end 43 of the cylinder 40. The cylinder 40 is disposed coaxially with the common center of the outlet passages 18, the closed lower end 42 of the cylinder 40 being upwardly spaced from the partition 9, as shown in Figs. 1, 2 and 7. Rigidly secured to the center of the bottom wall 42 is a boss 44, said boss and bottom wall 42 having aligned axial openings for the reception of a central shaft 45 that is secured at its lower end in a mounting flange 46 secured to the central portion of the partition 9. The upper end of the shaft 45 is supported by a threaded adjustment sleeve 47 having screw threaded thereon an enlarged adjustment nut 48 which rests upon a tubular portion 49 of a brace frame 50 that is rigidly secured to and extends diametrically across the under surface of the cover element 7. The closed lower end wall 42 of the cylinder 40 is provided with a discharge port 51 defined by a cross sectionally segmental tubular conduit 52 which is adapted to register with each of the outlet passages 18, the cylinder 40 being rotatable on the axis of the mounting shaft 45. The flanged bottom end 53 of the conduit 52 is upwardly spaced from the top surface of the partition 9 and the gaskets 17 only sufficiently to permit easy rotation of the cylinder 40 in the filtered air chamber 10. As shown, the piston 41 is provided with a central boss 54 having an axial opening which freely receives the mounting shaft 45. A coil compression spring 55 encompasses the mounting shaft 45 and has its upper and lower ends bearing against the threaded sleeve 47 and the central boss 54 respectively to yieldingly urge the piston 41 toward engagement with the end wall 42 or the cylinder 40.

Means for raising the piston 41 toward the open end 43 of the cylinder 40, and against bias of the compression spring 55, comprises a drive shaft 56 which is journaled in spaced bearings 57 and 58, the former of which is bolted or otherwise rigidly secured to the brace member 50, and the latter of which is secured to a second brace member 59 that is welded or otherwise rigidly secured to the cover plate 7, see Figs. 2 and 7. Crank means in the nature of a pair of cooperating crank elements 60 and 61 are mounted in axially side by side relationship on one end of the shaft 56, the former being rigidly secured to the shaft 56, and the latter being journaled thereon. A crank pin 62 projecting axially outwardly from the outer end of the journaled crank element 61 is mounted for pivotal and sliding movements in a slot 63 which extends longitudinally of and which is formed at the upper end of a rigid link 64, see particularly Fig. 10. The lower end of the link 64 is pivotally secured to a lifting lever 65, as indicated at 66, one end of the lifting lever 65 being pivotally secured to a bracket 67 mounted on the inner surface of the upper cylindrical wall section 2, see Figs. 7 and 8. The inner end 68 of the lever 65 is bifurcated and straddles the lower end portion of the central shaft 45 and spring 55, and is coupled to the central boss 54 of the piston 41 by a pair of rigid links or lifting bars 69. As shown, the bars 69 are pivotally connected at their upper and lower ends to the bifurcated end 68 of the lever 65 and the central boss 54 respectively. The crank element 60 is provided with an axially extending abutment member 70 that is adapted to engage a cooperating portion 71 of the journaled crank element 61 to impart rotary movement thereto in common with the shaft 56, and in a counterclockwise direction with respect to Fig. 10. This rotary movement imparted to the crank element 61 causes the piston 41 to be raised against bias of the spring 55 until the crank pin 62 passes top dead center relative to the shaft 56. Thereafter, the yielding bias of the spring 55 moves the piston 41 downwardly with a rapid stroke, the crank element 61 swinging circumferentially out of engagement with its cooperating crank element 60 and independently of the drive shaft 56. The piston 41 remains at the bottom of the cylinder 40 until the crank element 60 again swings into engagement with the crank element 61 to again raise the piston 41. Means for imparting rotary movement to the drive shaft 56 includes a motor 72 having a speed reduction transmission, not shown, but contained within a housing 73, to the output shaft 74 of which is rigidly secured a sprocket wheel 75. An endless link chain 76 runs over the sprocket wheel 75 and over a second sprocket wheel 77 rigidly mounted on the drive shaft 56. Preferably, and as shown, an idler wheel 78 journaled on a bell crank 79, maintains the drive chain 76 under proper driving tension, by means of a coil tension spring 80 secured at one end to the bell crank 79 and at its other end to the brace member 59, see Fig. 7. It will be noted that the motor 72 is mounted on the upper cylinder wall section 2 exterior of the casing, and that the drive chain extends through a relatively narrow opening 81 in the casing wall section 2.

For the purpose of imparting intermittent rotary movement to the cylinder 40 of the compressor 37, whereby to connect the port 51 successively with each of the outlet passages 18, I provide a plurality of ratchet elements in the nature of boltheads 82 circumferentially spaced on an annular flange 83 at the lower end of the cylinder 40, and a cooperating pawl element 44. The pawl element 84 is pivotally connected to the lower end of a shifting lever 85 by means of a universal joint 86, and is yieldingly biased toward engagement with the ratchet elements 82 by a torsion spring or the like 87 mounted on a nut-equipped bolt or the like 88 in the lower end of the shifting lever 85. The upper end of the lever 85 is pivotally connected to a bracket 89 that is rigidly secured to the brace member 59, and is oscillated by a pitman arm 90 having one end pivotally connected to the intermediate portion of the shifting lever 85, as indicated at 91, and its other end pivotally connected to a crank 92 fast on the adjacent end of the drive shaft 56. With the above arrangement, one full revolution of the drive shaft 56 will cause the pawl element 84 to engage one of the ratchet elements 82, rotate the cylinder 40 a given distance, and return to a point where the pawl element engages a succeeding ratchet element 82. The ratchet elements 82 are so spaced about the annular flange 83, that one complete feeding and return movement of the pawl element 84 will cause the port 51 of the cylinder 40 to move from full registration with a given outlet passage 18 into full registration with the next succeeding outlet passage 18.

The crank element 60 and the crank 92 are so disposed relative to each other on the drive shaft 56, that during forward feeding movements of the pawl element 84, the piston 41 is being raised toward the open end or side 43 of the cylinder 40, and during return movement of the pawl element 84, the piston 41 is moved rapidly downwardly by the spring 55 to impel a surge of air through the connected outlet passage 18 and its associated filter element 29 in a reverse direction to that of the normal airflow therethrough, whereby to dislodge dust which has accumulated on the outer surface of the filter wall 30 thereof. The adjacent radial baffles 27 prevent the dislodged dust from being drawn to adjacent filter elements 29 and permit the same to gravitate to the lower end portion 13 of the casing structure 1. It will be noted that, the opposite end or side 43 of the cylinder 40 being open, downward movement of the piston 41 will tend to further reduce air pressure within the upper filtered air chamber 10 by substantially the same amount as the pressure is increased in the separating chamber 12. This decrease in pressure in the chamber 10 and increase in the pressure within the chamber 12 is immediately equalized by movement of air upwardly through the other outlet passages 18 and the filter elements 29 associated therewith. Thus, the filter cleaning operation has no material effect on the movement of air inwardly through the inlet passage 20 to the separating chamber 12. Inasmuch as the motor 72 is normally in constant operation, the several filter elements 29 are successively maintained in a relatively clean condition, thus resulting in a highly efficient filtering of dust from the air. It will be further noted that during upward movement of the piston 41, filtered air is drawn into the cylinder 40 between the piston 41 and the closed end wall 42 thereof through the conduit 52 partly from a filter element 29 upon which the cleaning operation has been completed, and partly from a succeeding filter element to be cleaned. Inasmuch as the piston 41 is freely movable within the cylinder 40, there is some additional movement of filtered air into the lower portion of the cylinder between the cylindrical wall of the cylinder and the peripheral wall of the piston 41 and due to the relatively slow upward movement of the piston 41. Inasmuch as the piston 41 is moved downwardly by the spring 55 at a relatively rapid rate, leakage between the piston 41 and the inner cylindrical wall of the cylinder 40 on the downward stroke of the piston 41 is of little, if any, consequence. The closure plate 15 may be easily displaced for periodical removal of dust accumulating in the bottom portion 13, or, if desired, conventional valve means and a conduit, not shown, may be connected to the lower chamber 13 for continuous removal of dust therefrom.

My invention has been thoroughly tested and found to be completely satisfactory for the accomplishment of the objectives set forth, and while I have shown a commercial embodiment of my novel air filter apparatus, it will be understood that the same is capable of modification, and that modification may be made without departure from the spirit and scope of the invention as defined in the claims.

What I claim is:

1. In an air filtering apparatus, casing structure defining a separating chamber and a filtered air chamber and at least two outlet passages connecting said chambers, each of said outlet passages being equipped with air filter means, said casing structure having an air inlet passage to said separating chamber adapted to be connected to a source of dust laden air to be cleaned and a discharge passage from said filtered air chamber, air compressor apparatus in said filtered air chamber and comprising a cylinder having a closed end and an opposite open end, and a cooperating piston mounted in said cylinder for reciprocatory movements between the open and closed ends thereof, said closed end of the cylinder having a port and being movable to selectively connect said port to one of said outlet passages at the output side of its respective filter means, the open end of said cylinder communicating with the other of said outlet passages, yielding means urging said piston toward the closed end of said cylinder to produce a reverse air flow into said separating chamber through said one of the outlet passages and its respective filter means and to produce a corresponding displacement of air from the other of said outlet passages and respective filter means without materially disturbing the normal air flow to said separating chamber through said inlet passage, whereby to dislodge dust from the filter means of said one of the outlet passages without affecting the normal air cleaning function of the filter means of the other of said outlet passages, and mechanism for moving said piston in the opposite direction against the bias of said yielding means and including, a rotary drive shaft, a pair of cooperating crank elements one rigidly mounted on said drive shaft and the other journalled on said drive shaft, an abutment on one of said crank elements engageable with the other crank element radially outwardly of said drive shaft to provide driving engagement between said crank elements in one direction but permitting independent swinging movement of the journalled crank element in the same direction, and linkage connecting said journalled crank element to said piston, said crank elements providing a lost motion connection whereby, when said piston reaches its limit of crank element imparted movement against bias of said yielding means, said piston will be moved to its limit of travel in the opposite direction by said yielding means and independently of said drive shaft.

2. In an air filtering apparatus, casing structure defining a separating chamber and a filtered air chamber and including a partition common to said chambers, said partition defining a plurality of outlet passages connecting said chambers and arranged in circumferentially spaced relationship about a common center, said casing structure having an inlet passage to said separating chamber and adapted to be connected to a source of dust laden air to be cleaned and a discharge passage from said filtered air chamber, a plurality of filter elements mounted in said separating chamber and each operatively associated with a different one of said outlet passages, a cylinder mounted in said filtered air chamber for rotation on its own axis, said axis extending through said common center, said cylinder having a closed end and an open end, said closed end defining a port radially outwardly spaced from said axis for connection to one of said outlet passages, the open end of said cylinder communicating with said filtered air chamber and the others of said outlet passages, a piston in said cylinder, means for imparting intermittent rotary movement to said cylinder to connect said port to each of said outlet passages in succession, and means for moving said piston toward the closed end of said cylinder to produce a reverse surge of air into said separating chamber through the connected one of said outlet passages and its respective filter element and to produce a corresponding displacement of air from the other outlet passages and respective filter elements without materially disturbing the normal air flow to said separating chamber through said inlet passage, whereby to dislodge dust from the filter element of said connected outlet passage without affecting the normal air cleaning function of the filter elements associated with the other outlet passages, said piston moving means comprising, a spring urging said piston toward the closed end of the cylinder, a rotary drive shaft, crank means on said drive shaft, and a rigid link operatively coupled to said piston and said crank means, said crank means including a lost motion connection whereby, when said piston reaches its limit of crank imparted movement in one direction against bias of said spring, said piston will be moved to its limit of travel toward the closed end of said cylinder by said spring and independently of said drive shaft.

References Cited in the file of this patent
UNITED STATES PATENTS

| | | |
|---|---|---|
| 361,711 | Nagel et al. | Apr. 26, 1887 |
| 2,723,726 | Pellon | Nov. 15, 1955 |
| 2,731,107 | Hersey | Jan. 17, 1956 |